Patented Sept. 7, 1943

2,328,984

UNITED STATES PATENT OFFICE 2,328,984

METHOD OF MAKING DIHALO ACRYLONITRILES

Joy G. Lichty, Stow, Ohio, assignor to Wingfoot Corporation, Akron, Ohio, a corporation of Delaware No Drawing. Application June 3, 1941, Serial No. 396,427

2 Claims. (Cl. 260—464)

This invention relates to a method of treating certain halogenated nitriles with a basic reagent, to obtain products with a reduced proportion of halogen therein, and, more particularly, to a method of treating halogenated propionitriles with a tertiary amine.

In accordance with the terms of the invention, it has been found that propionitriles containing two or three halogen atoms may be treated with a tertiary amine to remove halogen in the form of hydrogen halide, the hydrogen halide usually forming a hydrohalide of the tertiary amine. The compounds thus obtained will be nitriles containing less hydrogen and less halogen than the starting materials. The method is especially useful in the preparation of unsaturated nitriles for use in polymerizations leading to the production of industrial materials. The illustrate, dichloro isobutyro nitrile may be reacted with quinoline to yield alpha methyl beta chloro acrylonitrile. The reaction is, of course, useful for the preparation of other similar compounds, depending on the starting materials which are reacted.

The reaction is applicable to the treatment of the class of alpha beta dihalo propionitriles which contain additionally, in the alpha position, one of the group consisting of alkyl and halogen radicals. That is to say, tertiary amines may be reacted with alpha alkyl alpha beta dihalo propionitriles and with alpha, alpha, beta, trihalo propionitriles. In each instance, the compounds containing chlorine are the most available but there may also be used the bromine compounds or compounds in which two different halogen radicals, such as chlorine and bromine, are represented.

The tertiary amine which is employed should preferably be one which boils at a higher temperature than that employed in the reaction because, otherwise, the amine would tend to distill out. Among such may be mentioned quinoline, isoquinoline, quinaldine, lepidine, alpha, beta and gamma phenyl pyridines and, in general, tertiary amines which have a boiling point above approximately 200° C. However, lower boiling tertiary amines may be used if a solution of the nitrile and the amine be passed through a heated tube and therein subjected to a high temperature for a sufficient period of time to effect the reaction. In this procedure lower boiling tertiary amines may be used, such as pyridine, picolines, lutidines, collidines, trimethylamine, triethylamine and tripropylamine. Whichever procedure is employed, the temperature should be raised to about 200° C. to complete the separation.

To illustrate the method, the following examples are given, although it will be understood that the invention is not limited thereto.

Example 1

A mixture of 84.5 grams of dichloro isobutyro nitrile and 100 grams of quinoline is distilled. After the distillation has been completed, the quinoline and quinoline hydrochloride is removed to obtain 34.4 grams of a product boiling between 120° and 158° C. The product is a mixture of the cis and trans forms of alpha methyl beta chloro acrylonitrile. The reaction is believed to proceed as follows:

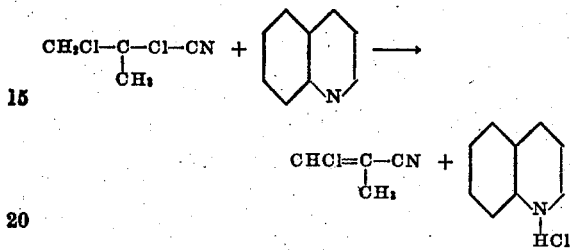

Example 2

Two mols (317 grams) of trichloro propionitrile and 2 grams of hydroquinone were placed in a 500 cc. 3-necked flask provided with a distillation condenser, a thermometer and a dropping funnel. The nitrile was heated on an oil bath to 150° C. and a temperatrue of 150–163° C. was maintained for a period of ¾ hour during the addition of 258 grams of quinoline and the heating was then continued to a final temperature of 210° C., during which a total of 208 grams of product distilled out. Application of reduced pressure gave an additional yield of 7 grams. Redistillation of the product resulted in the recovery of 132 grams of dichloro acrylonitrile boiling at 55–65 C./60 mm. and 68.3 grams of a product boiling at 64–79° C./60 mm., the higher boiling fraction being chiefly trichloro propionitrile. A yield of 69.3% of the trichloro propionitrile consumed was obtained. The reaction proceeds as follows:

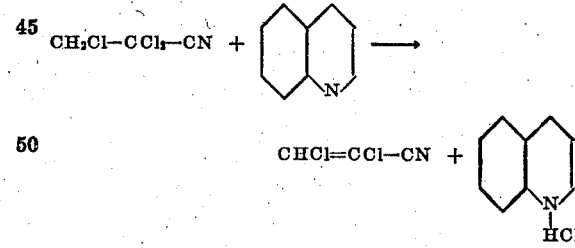

The conditions given above for the conduct of the reaction may be varied in numerous particulars as may be found necessary to secure the best yields of the desired product. In general, at least a molecular equivalent of the quinoline or other tertiary amine will be present for each mol of nitrile being treated and the temperature may be adjusted to secure the greatest conversion of the halogenated nitrile, a temperature ranging from 125° to 250° C. being effective in most instances. The product should be removed from the sphere of reaction as fast as formed to avoid interaction with the base and this is easily accomplished since the unsaturated nitrile has a boiling point lower than the base or the nitrile starting material. Thus, the product will be distilled off as formed and the reaction is completed when no further product comes over. In addition to the halo nitriles mentioned, other starting materials which can be subjected to the process are alpha ethyl alpha beta dichloro propionitrile, alpha methyl alpha beta dibromo propionitrile, alpha ethyl alpha beta dibromo propionitrile, and similar saturated halo propionitriles containing at least two halogen atoms in the molecule.

While there have been described above the preferred embodiments of the invention, it will be apparent to those skilled in the art that various modifications and changes may be made therein without departing from the spirit of the invention or from the scope of the appended claims.

I claim:

1. The method of reacting a trihalopropionitrile with a tertiary amine having a boiling point above about 200° C. to remove hydrogen halide and produce a dihalo acrylonitrile which comprises distilling the dihalo acrylonitrile from the sphere of the reaction substantially as soon as it is formed.

2. The method of reacting a tertiary amine having a boiling point above about 200° C. with trichloropropionitrile to remove hydrogen chloride and produce dichloro acrylonitrile which comprises heating the reaction to a final temperature of about 200° C. to remove the dichloro acrylonitrile from the sphere of the reaction substantially as soon as it is formed.

JOY G. LICHTY.